United States Patent [19]

Schommer

[11] 4,129,955

[45] Dec. 19, 1978

[54] ARTICLE FOR INJECTING AIR INTO LIVE BAIT

[76] Inventor: John Schommer, 17204 McFadden, Apt. B, Tustin, Calif. 92680

[21] Appl. No.: 824,433

[22] Filed: Aug. 13, 1977

[51] Int. Cl.² ............................................. A01K 85/00
[52] U.S. Cl. ......................................... 43/4; 128/215
[58] Field of Search ............. 43/4; 417/554; 128/220, 128/218 G, 215

[56] References Cited

U.S. PATENT DOCUMENTS

| 1,367,008 | 2/1921 | Bessesen | 128/220 |
| 2,156,023 | 4/1939 | McKay | 128/220 |
| 3,403,466 | 10/1968 | Young | 43/4 |

FOREIGN PATENT DOCUMENTS 935461 8/1963 United Kingdom ................. 417/554

*Primary Examiner*—James L. Jones, Jr.
*Attorney, Agent, or Firm*—Gary Appel

[57] ABSTRACT

An article in the shape of a handgun for injecting air into live bait, the device including a generally transparent barrel member having hypodermic needle centrally disposed with respect to the barrel and recessed therein. The barrel is stationary and coacts with a movable spring loaded plunger having a check valve in the closed end thereof, the plunger being actuable by the trigger of the gun to pass air through a spring loaded check valve into live bait such as a worm or the like.

6 Claims, 3 Drawing Figures

ARTICLE FOR INJECTING AIR INTO LIVE BAIT

BACKGROUND OF THE INVENTION

The background of the invention will be discussed in two parts:

1. Field of the Invention

This invention relates to articles for use by fishermen and more particularly to an article in the form of a gun used to insert fluid into live bait such as worms or the like.

2. Description of the Prior Art

Live fishing bait such as earthworms or night crawlers are commonly utilized by fishermen for fishing for many species of fish. The natural movement of the live bait is an attraction to fish. However, due to the specific gravity of the worm being greater than that of water, when a worm is used as live bait, the natural tendency of the worm is to sink. For fishing in proximity to the surface of the water, it is desirable to have a lure which has a specific gravity less than water to enable it to float. Correspondingly, when deep water fishing with a sinker, it is also desirable to have the bait positioned above the sinker preferably with some degree of floatation.

One prior art device is shown and described in U.S. Pat. No. 3,403,466 in which a plastic squeeze bottle provided with a hypodermic needle contains a fish-attractive agent at least partially in the vapor phase for injection into the internal tract of an angleworm to inflate, buoy, and enhance the fishing lure effectiveness of the worm. Such a device requires that the bottle be disassembled in order to insert the fish-attractive agent into the bottle prior to injection into the earthworm. Additionally, while being utilized, the hypodermic needle is fully exposed and care must be exercised in utilizing the device so as not to render harm to the user.

It is an object of the present invention to provide a new and improved air injecting device for live bait.

It is another object of this invention to provide a device which has the hypodermic needle shrouded to preclude harm to the user.

It is another object of this invention to provide a new and improved device permitting repeated injections of air into a worm without disengaging the needle from the worm.

SUMMARY OF THE INVENTION

The foregoing and other objects of the invention are accomplished by providing a device in the form of a handgun having a pistol grip portion and a trigger with a generally transparent barrel member having a hypodermic needle centrally disposed with respect to the barrel and recessed therein, the terminal portion of the barrel acting as a shroud. A movable spring loaded plunger is operatively coupled within the barrel and actuable by the trigger member. The free end of the plunger is provided with a ball-type check valve with a spring-loaded check valve adjacent the needle to permit repeated injections of air into the worm.

Other objects, features and advantages of the invention will become apparent from a reading of the specification when taken in conjunction with the drawings in which like reference numerals refer to like elements in the several views.

DESCRIPTION OF THE PREFERRED EMBODIMENT

Figure 1:
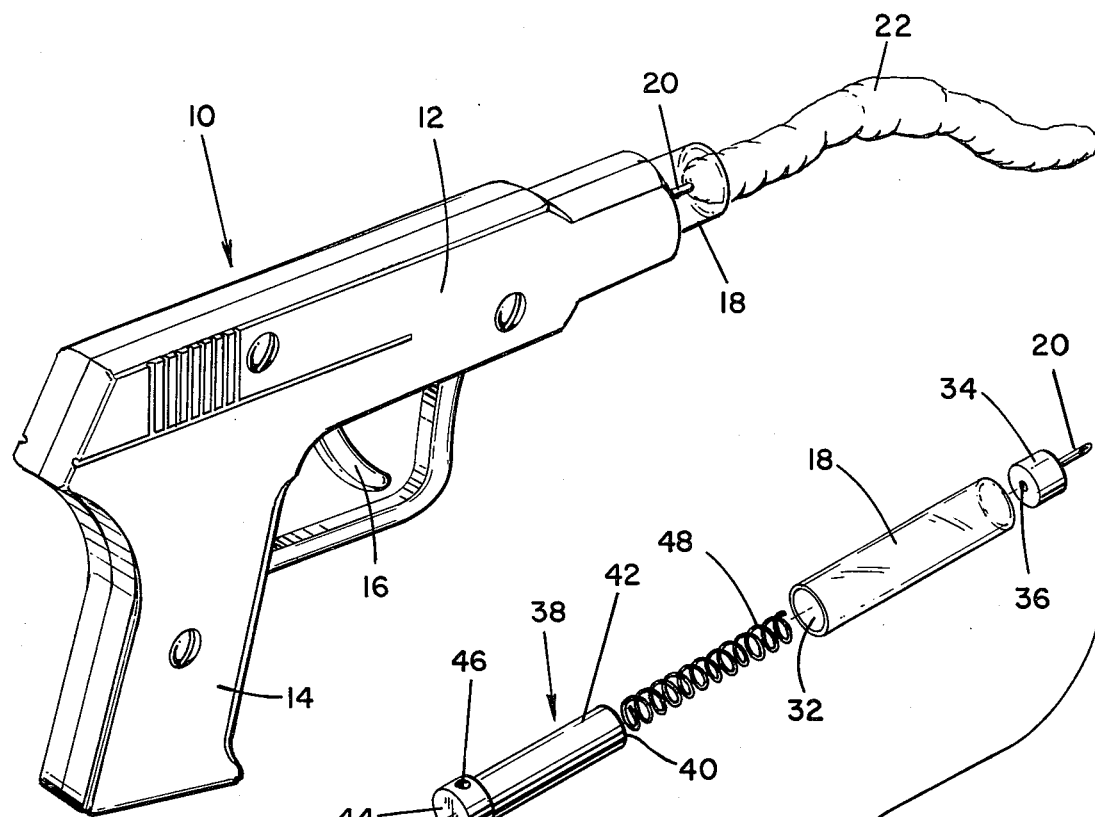
FIG. 1 is a perspective view of the live bait fluid injecting device according to the invention.

Referring now to the drawings and particularly to FIG. 1, there is shown a device generally designated 10 in the form of a handgun having a main body portion 12 with a transversely extending pistol grip or handle 14. A trigger 16 is provided and is pivotable in the manner of a conventional handgun. Extending outwardly from the main body member 12 is a generally transparent barrel portion 18 having centrally disposed therein a hypodermic needle 20. The barrel portion 18 is open ended with the needle 20 centrally disposed therein and suitably recesses so as not to extend beyond the terminal portion of the barrel 18. In use, the device permits repeated injections of air into a live bait such as an earthworm 22 without withdrawing needke 20. Although the drawing depicts the injection into one end of the earthworm 22, the diameter of the opening of barrel 18 is sufficient in size that the earthworm can be suitably bent for injection of the air within the device 10 into any body location of the earthworm 22.

Figure 2:
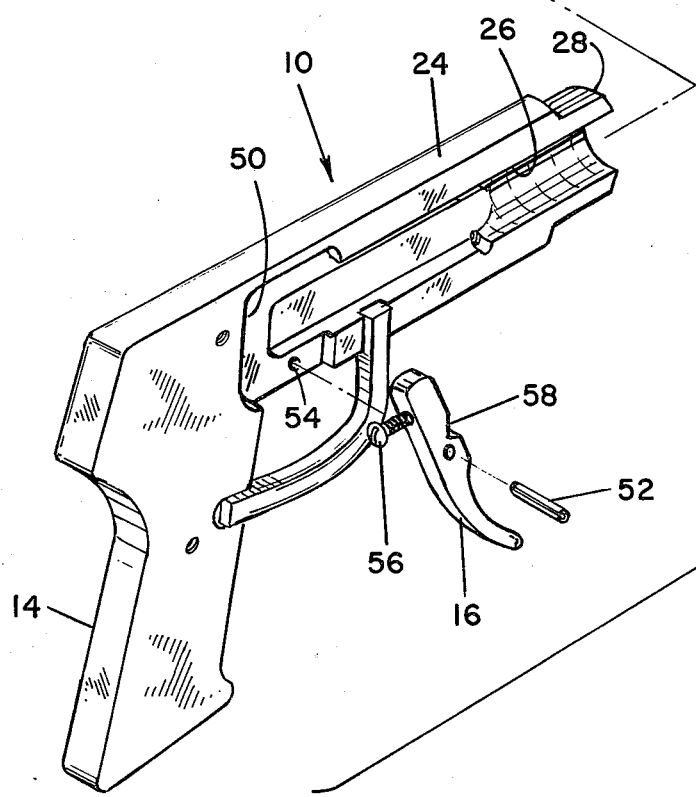
FIG. 2 is an exploded perspective view of the device of FIG. 1.
Figure 3:
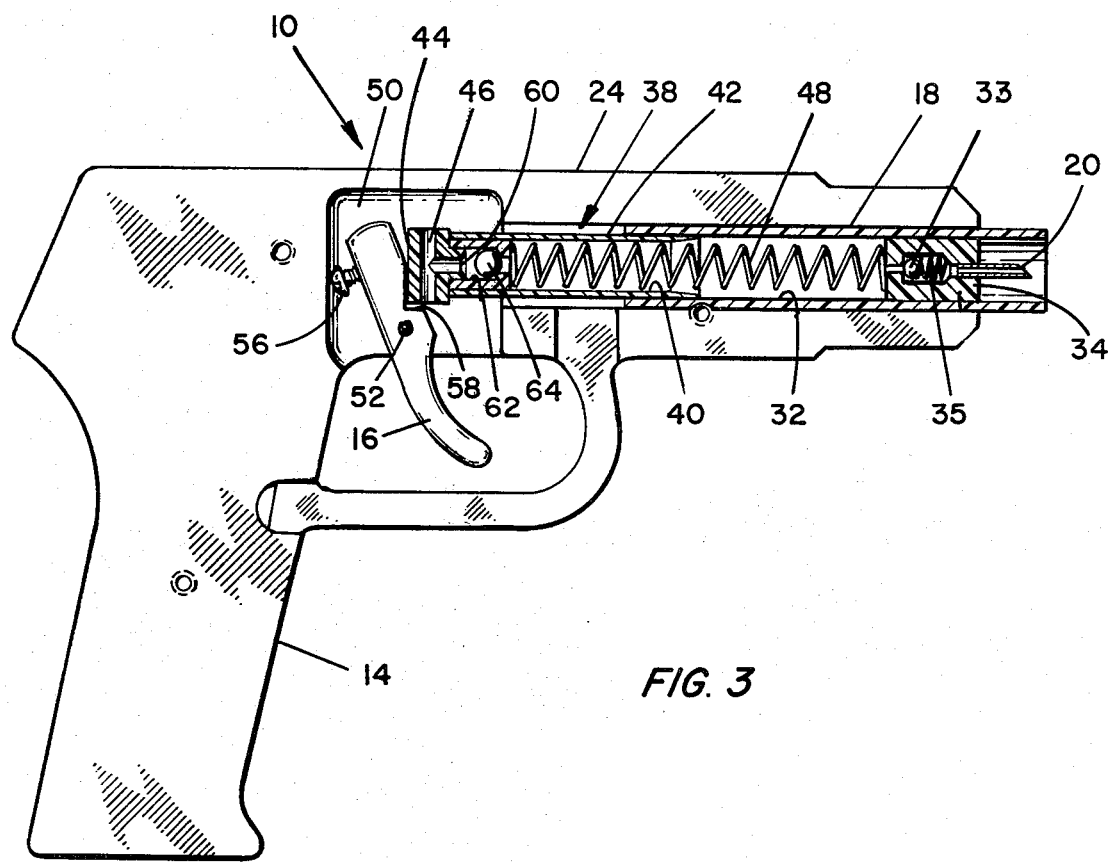
FIG. 3 is a side view of the left half of the device of FIG. 1 showing the assembled components in cross-sectional view.

As shown in FIGS. 2 and 3, the device 10 is made up of two complementary housing halves, one half 24 being shown, with the other half thereof being matingly configured. The half 24 is suitably cut away to form a cavity 26 for receiving the components therein, the cavity 26 adjacent the front end 28 of the half housing 24 being arcuately configures for receiving therein an elongate barrel member 18 which is made of clear polystyrene material, the barrel member 18 being approximately three inches long and having the opening 32 thereof slightly larger than one-half inch in diameter. A plug 34 is inserted within the opening 32 of the barrel member 18 and suitably secured by adhesive means or the like. The plug 34 contains a centrally disposed aperture 36 in communication with a hypodermic needle 20 which is provided with a tapered end portion to facilitate insertion into the worm 22. The plug 34 contains a central cavity in alignment with the axis of needle 20, the cavity housing a spring-loaded check valve consisting of ball 33 urged rearwardly by the bias of spring 35.

Insertable within the barrel member 18 is a plunger generally designated 38, which is provided with an axially extending cup-shaped recess 40. The plunger member 38 includes a main body portion 42 which is circular in cross section and has an outer diameter generally equal to the inner diameter of opening 32 for mating slidable engagement therein. Rearwardly of the main body portion 42, the plunger assembly 38 terminates in an enlarged cap portion 44 which has an aperture 46 extending diametrically through the flange thereof. A spring member 48 fits within the cup-shaped recess 40 of the plunger assembly 38 and is of sufficient length to coact between the bottom of the recess 40 and the face of plug member 34 to resiliently bias the plunger assembly 38 rearwardly.

The trigger member 16 is mounted within a trigger receiving cavity 50 formed on the inner surface of half 24, the trigger assembly 16 having a pair of coaxial projections 52 adapted to fit within recess 54 formed within cavity 50 for pivotally supporting trigger member 16. A rearward trigger stop means 56 is integrally formed within cavity 50 to define the rearward pivoting movement of the upper half of trigger member 16. The upper half of trigger member 16 is suitably cut away to provide a notch 58 adapted for abuttingly engaging the flange or cap portion 44 of plunger assembly 38.

As shown in FIG. 3, the components previously described are shown in assembled relation with the barrel 18 extending beyond the terminal end of the gun half 24 to provide a transparent shroud encompassing the hypodermic needle 20, the pointed end of which is recessed within barrel member 18 to guard the user of the device 10 from accidentally contacting the hypodermic needle 20. The compression spring 48 is shown in place and has one end thereof abutting against the face of plug 34 with the other end thereof fitting within the cup-shaped recess 40 formed within the main body portion 42 of plunger assembly 38 to urge the plunger assembly 38 to the left against the notch 58 formed in trigger member 16. To facilitate insertion of the spring 48 within the recess 40, the inner diameter of the main body portion 42 adjacent the open end thereof is tapered. As can be seen, the cap member 44 is provided with the diametrically extending aperture 46 which communicates with an axially extending aperture 60 extending through the cap member 44, the aperture 60 being suitably enlarged at its mid-portion 62 for loosely receiving therein a steel ball 64 for providing check valve means. The aperture 60 communicates with the interior chamber formed by the cup-shaped recess 40 in sliding contact within opening 32 of barrel member 18.

In operation of the device as the trigger 16 is pulled or rotated clockwise as viewed in FIG. 3, the upper half of trigger member 16 has notch 58 thereof engaging the cap 44 to urge plunger assembly 38 against the force of compression spring 48. During this movement, the compression of the air or fluid within the chamber urges the ball 64 rearwardly to close the reduced diameter rearward opening of aperture 60 thereby forcing the air within the chamber against ball 33 to urge ball 33 against the force of spring 35 to thereby discharge the air out through the opening of hypodermic needle 20. When the trigger 16 is released, air attempting to enter the chamber through the needle 20 is blocked due to the spring 35 and ball 33 blocking the entrance back into the chamber. During this movement, the steel ball 64 moves toward the forward opening not being in mating engagement with ball 64 thereby permitting air to enter the chamber through aperture 46 of cap 44 through aperture 60. With the needle 20 inserted into an appropriate part of the body of the earthworm 22 for injection of the air within the chamber into the earthworm, the trigger member 16 can be repetetively depressed to pump the required amount of air into the earthworm 22 without the necessity of withdrawing the needle 20 from within the body of the earthworm 22 due to the check valve means provided in the plug member 34. The utilization of the device 10 is simple, effective and safe and can be easily cleansed by utilizing water.

While there has been shown and described a preferred embodiment, it is to be understood that various other adaptations and modifications may be made within the spirit and scope of the invention.

What is claimed is:

1. In a device for injecting a fluid or the like into live bait, the combination comprising:
 a body member having a cavity formed therein;
 a barrel member supported partially within said cavity and having an opening extending therethrough;
 plunger means within said cavity in sliding engagement within one end of said opening;
 hypodermic needle means within said opening adjacent the other end of said barrel, said hypodermic needle means including a hypodermic needle centrally disposed with respect to said opening and recessed within said barrel; and
 means for actuating said plunger member to force fluid from within said barrel member.

2. The combination according to claim 1 wherein said plunger member includes check valve means for permitting fluid to be drawn into said barrel member through said hypodermic needle.

3. The combination according to claim 2 wherein said actuating means includes spring means for biasing said plunger member away from said hypodermic needle means and trigger means for actuating said plunger means against the force of said spring means.

4. The combination according to claim 3 wherein said hypodermic needle means includes other check valve means, said check valve means and said other check valve means enabling repetitive injections of air into said live bait without withdrawing said hypodermic needle.

5. In a device for injecting fluid or the like into live bait, the combination comprising:
 a body member configured in the form of a handgun and having a component receiving cavity formed therein;
 trigger means pivotally coupled to said body member at least partially within said cavity;
 a transparent tubular barrel member within said cavity and having one end extending partly out of said body member;
 a plug member sealingly engaging the opening of said one end of siad barrel member, said plug member having a hypodermic needle extending therethrough with the top of said needle recessed from said one end of said barrel opening;
 spring-biased plunger means within the opening of the other end of said barrel member, said plunger means having a cap portion engaging said trigger member for slidable movement within said barrel member in response to pivoting of said trigger member; and
 check valve means within said cap portion for permitting the drawing of fluid into said barrel member and the forcing of fluid out of said barrel member through said hypodermic needle.

6. The combination according to claim 5 wherein plug member includes a spring-loaded check valve in fluid communication with said barrel and said needle, said spring-loaded check valve opening in response to fluid urging thereagainst.

* * * * *